(12) United States Patent
Forrester, Jr.

(10) Patent No.: US 12,038,205 B2
(45) Date of Patent: Jul. 16, 2024

(54) COMBINED WATER HEATER AND THERMOSTATIC CONTROL

(71) Applicant: NATIONAL MACHINE COMPANY, Stow, OH (US)

(72) Inventor: Raymond Alvero Forrester, Jr., Akron, OH (US)

(73) Assignee: NATIONAL MACHINE COMPANY, Stow, OH (US)

( * ) Notice: Subject to any disclaimer, the term of this patent is extended or adjusted under 35 U.S.C. 154(b) by 517 days.

(21) Appl. No.: 17/296,131

(22) PCT Filed: Nov. 25, 2019

(86) PCT No.: PCT/US2019/062952
§ 371 (c)(1),
(2) Date: May 21, 2021

(87) PCT Pub. No.: WO2020/112607
PCT Pub. Date: Jun. 4, 2020

(65) Prior Publication Data
US 2022/0018575 A1 Jan. 20, 2022

Related U.S. Application Data

(60) Provisional application No. 62/771,881, filed on Nov. 27, 2018.

(51) Int. Cl.
*F16K 31/06* (2006.01)
*F16K 11/07* (2006.01)
(Continued)

(52) U.S. Cl.
CPC .............. *F24H 1/122* (2013.01); *F16K 11/07* (2013.01); *F16K 31/0682* (2013.01);
(Continued)

(58) Field of Classification Search
CPC ...... F24H 9/2028; F24H 9/2014; F24H 1/122; F24H 1/009; F16K 11/07; F16K 31/0682;
(Continued)

(56) References Cited

U.S. PATENT DOCUMENTS

| 2,385,132 A | 9/1945 | Graham |
| 2,901,175 A | 8/1959 | Keppel |

(Continued)

FOREIGN PATENT DOCUMENTS

| WO | 2017/015593 A1 | 1/2017 |

OTHER PUBLICATIONS

International Search Report and the Written Opinion of the International Searching Authority (Form PCT/ISA/220); International Application No. PCT/US19/62952; dated Feb. 7, 2020; Date of International Filing Nov. 25, 2019; 13 pages.

*Primary Examiner* — Gregory A Wilson
(74) *Attorney, Agent, or Firm* — Vorys, Sater, Seymour and Pease LLP; Mark A. Watkins

(57) ABSTRACT

A combined water heater and thermostatic control device that combines the functionality of a water heater, thermostat and shut off valve, and may be installed in various aircraft lavatory applications to facilitate installation, consolidate functions, and reduce the probability of leaks. The combined device may include a water tank assembly, a torque motor valve and servo valve assembly, and a shut-off valve assembly. The combined device may also include a temperature control unit that senses water temperature in a water tank assembly and may activate a water heater.

20 Claims, 10 Drawing Sheets

(51) Int. Cl.
F16K 31/42 (2006.01)
F24H 1/00 (2022.01)
F24H 1/12 (2022.01)
F24H 9/20 (2022.01)
F24H 15/223 (2022.01)
F24H 15/248 (2022.01)
F24H 15/281 (2022.01)
F24H 15/37 (2022.01)
G05D 23/13 (2006.01)

(52) U.S. Cl.
CPC ........... F16K 31/426 (2013.01); F24H 1/009 (2013.01); F24H 9/2014 (2013.01); F24H 9/2028 (2013.01); F24H 15/223 (2022.01); F24H 15/248 (2022.01); F24H 15/281 (2022.01); F24H 15/37 (2022.01); G05D 23/1393 (2013.01)

(58) Field of Classification Search
CPC . F16K 31/426; G05D 23/1393; G05D 23/132
See application file for complete search history.

(56) References Cited

U.S. PATENT DOCUMENTS

| | | | |
|---|---|---|---|
| 3,356,827 A * | 12/1967 | Angelery | H01H 35/2635 392/318 |
| 5,404,794 A | 4/1995 | Patel et al. | |
| 5,904,291 A * | 5/1999 | Knapp | G05D 23/1346 137/88 |
| 6,267,046 B1 | 7/2001 | Wanat | |
| 9,340,958 B2 * | 5/2016 | Peel | E03C 1/044 |
| 9,599,365 B2 * | 3/2017 | Hardesty | F24H 9/133 |
| 10,168,073 B2 * | 1/2019 | Harbin, III | F24H 15/20 |
| 10,760,819 B2 * | 9/2020 | Yuan | G05D 23/1393 |
| 10,921,025 B2 * | 2/2021 | Shaffer, Jr. | F24H 9/0021 |
| 2013/0340162 A1 * | 12/2013 | Peel | G05D 23/1393 4/676 |
| 2018/0209692 A1 * | 7/2018 | Shaffer, Jr. | F24H 15/37 |

* cited by examiner

COMBINED WATER HEATER AND THERMOSTATIC CONTROL

CROSS-REFERENCE TO RELATED APPLICATIONS

This application is a national stage application of pending International Patent Application No. PCT/US2019/062952 filed Nov. 25, 2019, which claims priority to and the benefit of U.S. Provisional Application No. 62/771,881 filed Nov. 27, 2018, which are incorporated by reference herein in their entirety.

BACKGROUND

Heated water is customarily provided in commercial and noncommercial aircraft lavatories for hand-washing purposes as well as in galleys for preparation of food and beverage. In aircraft application, however, the type of equipment utilized to provide heated water is subject to size and weight constraints. In addition, many conventional heated water systems include a number of different pieces of equipment, which increases the likelihood of water leaks. Leaking water may damage other aircraft equipment, causing maintenance and delays. Also, maintenance of these conventional systems may be more expensive and time consuming, as they include different components that are not necessarily all disposed in the same compartment or location. Moreover, it is desirable in commercial aircraft application that the water be outputted at desired temperature as quickly as possible and for the tank to recover as quickly as possible.

SUMMARY

Presently disclosed is a water heater and thermostatic control device for a lavatory faucet. The water heater and thermostatic control device may include various sub-assemblies, including a hot water tank, a thermal mixing valve, a shut off valve, and a controller.

The hot water tank thereof may include a reservoir and a heating element disposed within the reservoir, wherein the heating element heats ambient temperature water received by the reservoir to produced hot water. Ambient temperature water may be received from various sources, including a water supply on a vehicle.

The thermal mixing valve thereof may be configured to mix hot water received from the hot water tank with ambient temperature water to produce mixed temperature water. In some embodiments, the thermal mixing valve includes a torque motor valve and a servo valve. In some embodiments, the thermal mixing valve is controlled by the controller so as to produce mixed temperature water having a temperature that matches a temperature specified by the user at an input.

The shut off valve thereof may be configured to permit flow of mixed temperature water to the faucet. The controller may control the shut off valve to permit flow based on instructions received by the controller from the faucet, and such instructions may correspond to a user activating or engaging the faucet to receive water therefrom at a user-specified temperature.

As mentioned, the water heater and thermostatic control device includes a controller. The controller may be in communication with the hot water tank, the thermal mixing valve, the shut off valve, or any combination of the aforementioned. The controller may be configured to open or close the shut off valve. In some embodiments, the controller may control temperature of the heating element based on temperature readings from a thermocouple that measures the temperature of water within the reservoir.

In some embodiments, the faucet is temperature-adjustable such that a user may set the faucet to output water at one or more output temperatures. In such embodiments, the controller may be in communication with the thermal mixing valve to control metering of hot water and ambient temperature water within the thermal mixing valve to produce mixed temperature water having a temperature that equals the user specified temperature set at the faucet. In these embodiments, the controller may adjust metering within the thermal mixing valve based on temperature readings from a thermocouple that measures the temperature of the mixed temperature water. Also, in some of these embodiments, the thermocouple may be downstream of the shut off valve, whereas in other embodiments, the thermocouple is upstream from the shut off valve or integrated into the faucet.

In some embodiments, the hot water tank includes a level sensor that is in communication with the controller. In these embodiments, the controller may be configured to vary the power input to the heating element based on readings from the level sensor, and may even turn off or cut power to the heating element if no water or insufficient water is detected by the level sensor.

In some embodiments, the shut off valve is configured to permit air to bleed or vent through the shut off valve when it is both not energized by the controller and not subject to water pressure from the mixed temperature water. In some of these embodiments, the shut off valve is configured to inhibit flow of mixed water through the shut off valve when it is both subject to water pressure from the mixed temperature water and not energized by controller; and, in some of these embodiments, the shut off valve is configured to allow flow of mixed water through the shut off valve when it is energized by the controller.

In some embodiments, the shut off valve includes a diaphragm and an armature assembly, where the armature assembly may be movable between an open and closed position via a solenoid. In these embodiments, the diaphragm may be configured to permit air to bleed or vent through the shut off valve when the mixed temperature water is not imparting pressure on the diaphragm. In some of these embodiments where the shut off valve also includes the solenoid, energization of the solenoid may cause the armature assembly to move between the closed position and the open position.

In embodiments where the shut off valve includes the armature assembly, the armature assembly may be biased in either the open or closed position. In some embodiments, the armature assembly is biased in the closed position such that mixed water is inhibited from flowing through the shut off valve. In some of these embodiments, energization of the solenoid moves the armature assembly into the open position such that mixed water may flow through the shut off valve.

In some embodiments, the heating element is configured as a flow-through heater. In optional embodiments, the hot water tank includes a pressure relief valve. In some embodiments, the hot water tank includes a thermostat that is unassociated with the controller, and the hot water tank is configured to cut power to the heating element based on readings from the thermostat. In some of these embodiments, the hot water tank further includes a manual reset for resupplying power to the heating element. In embodiments, the hot water tank may include a thermal fuse configured to trip and cut power to the heating element. In some embodiments, the hot water tank includes an insulator blanket to protect users from being burnt when touching an exterior surface of the water heater and thermostatic control device.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to water heaters and, more particularly, to devices having the functionality of a water heater, thermostat, and shut off valve.

Figure 1:
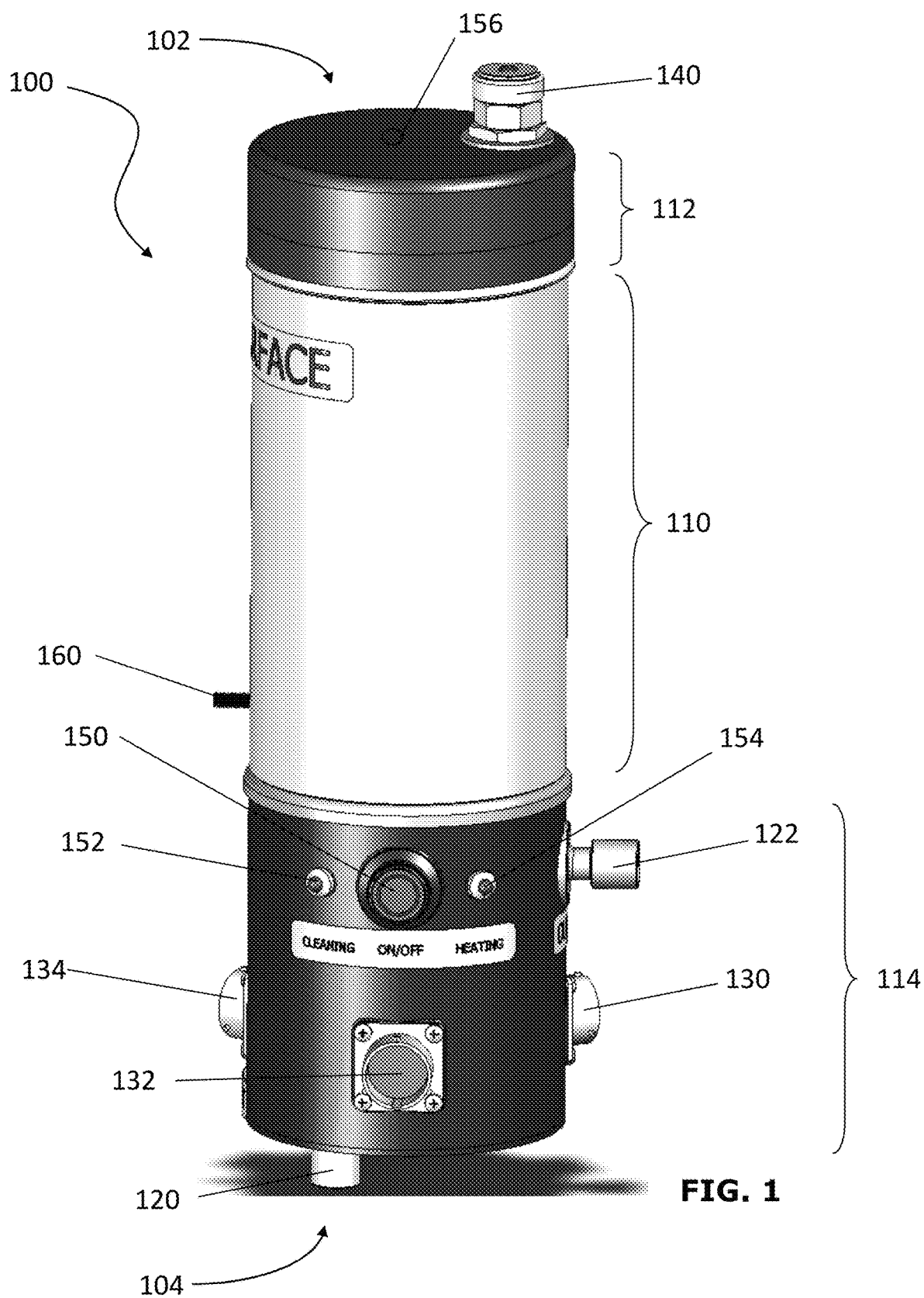
FIG. 1 is an isometric view of an example combined water heater and thermostatic control device, according to one or more embodiments of the present disclosure.

FIG. 1 is an isometric view of an example combined water heater and thermostatic control system 100 (hereinafter, the "combined device 100"), according to one or more embodiments of the present disclosure. As more fully described below, the combined device 100 may operate to perform a combination of functions. In the illustrated embodiment, the combined device 100 includes a water heater, a torque motor valve, a servo valve, a solenoid shut off valve, and a temperature control unit. Thus, the combined device 100 consolidates the number of components or equipment, which in turn facilitates installation and maintenance and decreases the probability of leaks.

In the illustrated embodiment, the combined device 100 is provided as a cylindrically shaped body having an upper end 102 and a lower end 104. The combined device 100, however, may have different geometries depending on the particular application into which it will be installed. Also, the combined device 100 may have one or more discrete compartments or sections. Here, for example, the combined device 100 includes a reservoir section 110, an upper section 112 disposed on top of the reservoir section 110 proximate to the upper end 102, and a lower section 114 disposed under the reservoir section 110 proximate to the lower end 104 of the combined device 100. In particular, the upper section 112 and the lower section 114 are caps installed on the top and bottom of the reservoir section 110, respectively, and configured to house various components of the combined device 100 as described hereinafter. In addition, the reservoir section 110 includes a water tank and various heating components.

The combined device 100 includes an inlet 120 and an outlet 122. Here, the inlet 120 is arranged on a bottom face of the lower section 114 and the outlet 122 is arranged on a periphery of the lower section 114 such that it extends in a direction that is perpendicular to the inlet 120. The inlet 120 and the outlet 122 may be differently arranged and oriented relative to each other on the combined device 100, however, without departing from the present disclosure. For example, both the inlet 120 and the outlet 122 may be provided on the bottom face of the lower section 114 or both may be provided on the periphery thereof. Moreover, either or both of the inlet 120 and the outlet 122 may be provided with fittings for receiving one or more pipes or flexible hoses. Here, for example, both the inlet 120 and the outlet 122 pare provided with fittings designed to AS1656-3-06 and are made from 316 Stainless Steel per ASTM-A-276.

The combined device 100 may also include one or more electrical interfaces. Here, for example, the combined device 100 includes three (3) electrical connectors 130,132,134 arranged around the periphery of the lower section 114; however, in other embodiments they are differently arranged about the exterior of the combined device 100. In other embodiments, the combined device 100 may include more or less than three (3) of the electrical connectors 130,132, 134, which may be provided at the same or at different locations about the exterior of the combined device 100. Also, in some embodiments, the electrical connectors 130, 132,134 are all configured to receive the same type of electrical cable, whereas in other embodiments groups of two (2) or more may be the same or they may all be different.

One of the electrical connectors (e.g. the electrical connector 130) may be configured to receive direct current ("DC") and may be provided with various types of suitable electrical connectors. In the illustrated embodiment, the electrical connector 130 is provided in accordance with EN3645-F7CN35BN, and provides DC power to the combined device 100 but may also provide some CAN BUS connections too. In addition, the electrical connector 130 may be provided according to different specifications instead of EN3645-F7CN35BN. Another of the electrical connectors (e.g., the electrical connector 132) may be configured to receive alternating current ("AC") and may be provided with various types of suitable electrical connectors. In the illustrated embodiment, the electrical connector 132 is provided in accordance with EN3646-RS71412MN, and provides AC power to the combined device to power the water heater. However, In addition, the electrical connector 132 may be provided according to different specifications instead of EN3646-RS71412MN. Also, another of the electrical connectors (e.g., the electrical connector 134) is configured to communicate with other electronic components and microcontrollers, and may thus be provided with various types of suitable electrical connectors such as CAN BUS. In the illustrated embodiment, the electrical connector 134 is provided in accordance with EN3645-F7CN35AN and integrates the combined device 100 into the CAN BUS system such that the combined device 100 may communicate with various aircraft systems and hardware, such as lavatory water faucets. However, the electrical connector 134 may be provided according to different specifications instead of EN3645-F7CN35AN.

As illustrated in FIG. 1, the combined device 100 may also have various safety features and/or other features that facilitate its operation. For example, the combined device 100 may be configured to maintain internal pressures at a suitable internal pressure range. In the illustrated example, the combined device includes a pressure relief valve 140. The pressure relief valve 140 is an optional feature and discussed below. Also in the illustrated example, the combined device includes a powering means 150 for turning the combined device 100 on or off, or switching it between one of various modes. Here, the powering means 150 is provided on the lower section 114 of the combined device 100; however, it may be differently provided on the combined device 100. In some non-illustrated embodiments, the powering means 150 may be provided to permit remote control of the combined device 100 such that it is turned off and on from a remote location. Here, the powering means 150 is configured as a press button switch. The powering means 150 may be differently configured, however, and may thus include a toggle switch, rotary switch, or various other switches. The combined device 100 may also include one or more indication means for providing visual or audible feedback to the user as to the status of the combined device 100 and/or to provide the user various other types of information. Here, the indication means includes a pair of LED visual indicators, where a first visual indicator 152 informs the user as to whether the combined device 100 is operational and heating water, and a second visual indicator 154 informs the user whether the combined device 100 is in a cleaning or maintenance mode. Additional visual indicators may be provided. Other types of visual indicators may be provided in addition to or in lieu of the visual indicators 152,154. Moreover, the indication means may include audible indicators that provide an audible notification to the user as to the status of the combined device or provide other types of relevant audible information to the user; and such audible indicators may be provided in addition to visual indicators (e.g., the visual indicators 152,154) or in lieu thereof. The combined device 100 may also include a mounting means 160 configured to mount or suspend the combined device 100 in a particular end use application. Here, for example, the mounting means 160 is a bolt extending from a periphery of the combined device 100 for mounting to a wall, ceiling or other structure within a mechanical compartment of an aircraft.

Figure 2:
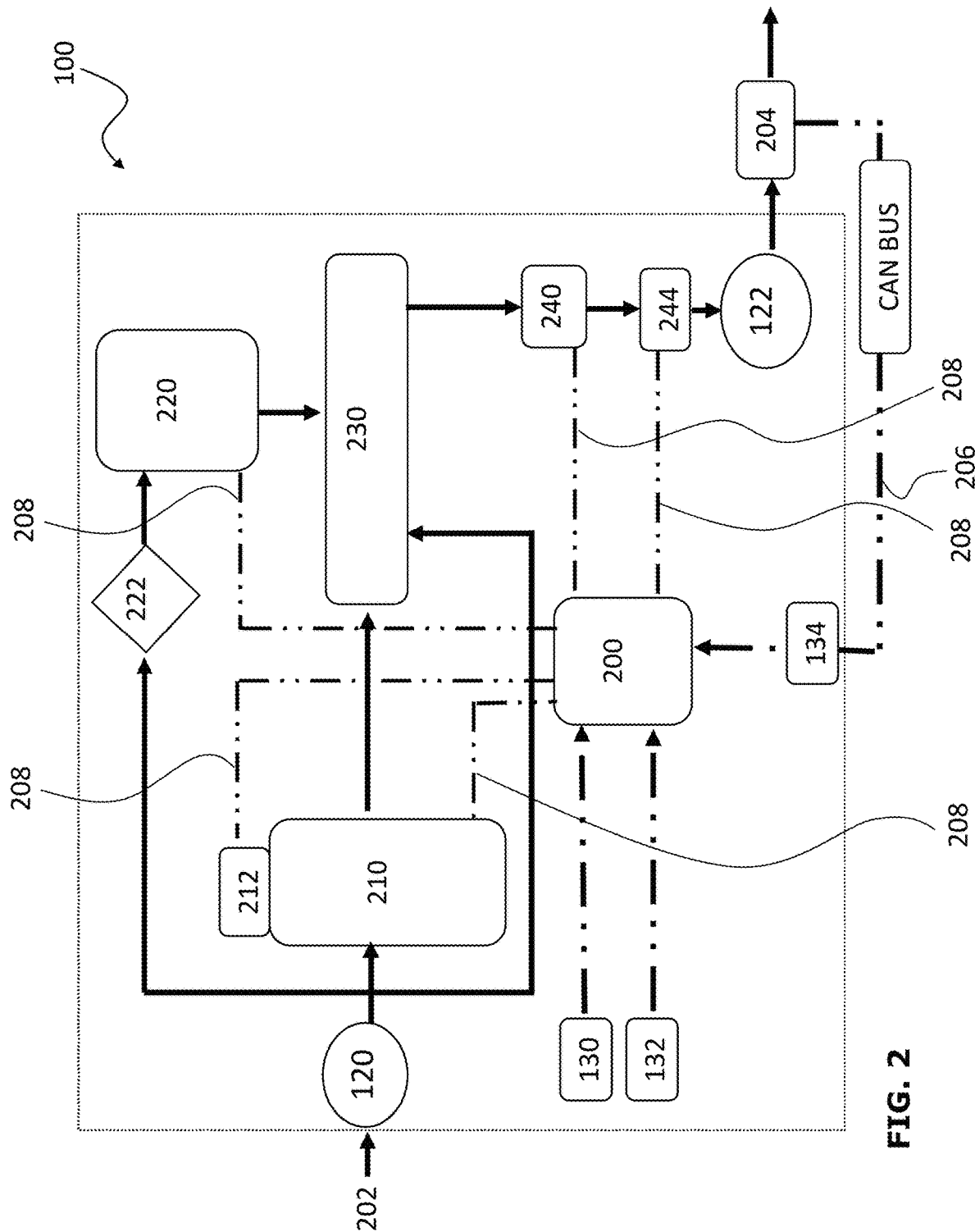
FIG. 2 is a schematic of the combined water heater and thermostatic control device of FIG. 1.

FIG. 2 illustrates a schematic of the combined device 100 having a temperature control unit 200, according to one or more embodiments of the present disclosure. FIG. 2 also illustrates the combined device 100 being utilized with an exemplary water supply 202 and an exemplary faucet 204, according to one or more embodiments of the present disclosure. The water supply 202 may be a reservoir or (potable or non-potable) water system integrated into the existing infrastructure of an aircraft (or other vehicle). Many alternative designs and configurations of the water supply 202 may be employed, without departing from the scope of this disclosure. Similarly, the depicted faucet 204 is just one example faucet that can suitably incorporate the principles of the present disclosure. Indeed, many alternative designs and configurations of the faucet 204 may be employed, without departing from the scope of this disclosure.

The faucet 204 is integrated into the CAN BUS by means of communication of the TCU controller 200 and may be installed at various locations in the aircraft, including in a lavatory or galley thereof. Thus, combined device 100 may connect to the faucet 204 via one of the electrical connections 130,132,134. In the illustrated embodiment, the aircraft includes a connection or cable 206 that is integrated into its CAN BUS system, including the faucet 204, and the cable 206 is connected to the electrical connector 134 of the combined device 100. Thus, the combined device 100 communicates with the faucet 204 and the CAN BUS system via the connection between the electrical connector 134 and the cable 206.

In some embodiments, the faucet 204 is an automatic faucet equipped with a proximity sensor and mechanism that opens its valve to allow water to flow in response to the presence of a hand or hands in close proximity thereto, and closes its valve again after a few seconds or when it no longer detects the presence of a hand or hands. In these embodiments, the automatic faucet may incorporate an active infrared ("IR") sensor (or other type of proximity or presence sensor) to detect motion and may be battery powered or externally powered (e.g., via the aircraft). In one embodiment, the faucet 204 is an IR faucet for pre-tempered water where the outlet temperature of hot water flowing therefrom is set in advance such that end users may not adjust the outlet temperature. In other embodiments, the faucet 204 is configured to permit an end user to adjust (on-demand) the outlet temperature of hot water flowing out of the faucet 204. As more fully described below, the combined device 100 may be easily installed and integrated into existing aircraft infrastructure, such as the faucet 204 and the CAN BUS, which in turn facilitates ease of maintenance.

As illustrated, the combined device 100 is a system that includes several other components, including a hot water tank assembly 210 having a tank thermocouple 212, a torque motor valve 220 having a filter 222, a servo valve 230, a shut-off valve 240, and a faucet thermocouple 244. The temperature control unit 200 (hereinafter the "TCU 200") communicates with the hot water tank assembly 210, the tank thermocouple 212, the torque motor valve 220, the shut-off valve 240, and the faucet thermocouple 244 via electrical connections 208. The TCU 200 also communicates with the faucet 204, as detailed above.

The hot water tank assembly 210 (hereinafter, the tank 210) may include various types of heated water tank assemblies. In one embodiment, the tank 210 is generally constructed from AISI 316 stainless steel components and includes a reservoir sized to hold approximately thirty-eight (38) to sixty-four (64) ounces ("oz") of water, but the tank 210 may be configured to hold any number of volumes of water above or below the foregoing range. Here, the reservoir of the tank 210 is designed to yield an air gap at the top of the reservoir to allow for expansion of the water therein during freezing conditions without damaging the structure. Additionally, the reservoir of the tank 210 may be designed to withstand various internal pressures without sustaining damage, for example, it may withstand internal pressures in excess of 300 pounds per square inch ("psig"). When installing the combined device 100 in a particular end use application, the inlet 120 of the combined device 100 is fluidly connected to the water supply 200 of the existing aircraft infrastructure. Thus, cold (or unheated) water from the water supply 200 enters the reservoir of the tank 210 reservoir through the inlet 120. In addition, heated water exiting the tank 210 is diverted to the servo valve 230.

The tank 210 may include various types of heating elements or heaters therein. These heaters may be configured as cartridges to facilitate replacement in the tank 210. Also, the thermocouple 212 may be configured to measure the temperature of the water within the tank 210. In the illustrated embodiment, the tank 210 includes a flow-through heater that thermodynamically pumps heated water to promote thermal mixing within the tank. This type of heating is commonly referred to as a thermosiphon, and relies on natural convection to circulate the water within the reservoir of the tank 210. Mechanical mixing devices are not necessary to promote mixing of warm and cool water within the reservoir of the tank 210 in applications where the flow-through heater is utilized; however, one or more mechanical mixing devices may nevertheless be utilized in some embodiments to facilitate thermal mixing. In other embodiments, however, the heater of the tank 210 need not be configured as a flow-through heater. Thermosiphon pumping is active passive feature that does not depend on water draw from the combined device 100 to circulate heated water within the reservoir during recovery periods (i.e., when the combined device 100 is heating a new volume of water after heated water is drawn from the reservoir). Thus, the flow-through heater may assist in shortening initial heat-up and recovery times after water is drawn from the tank.

Figure 3:
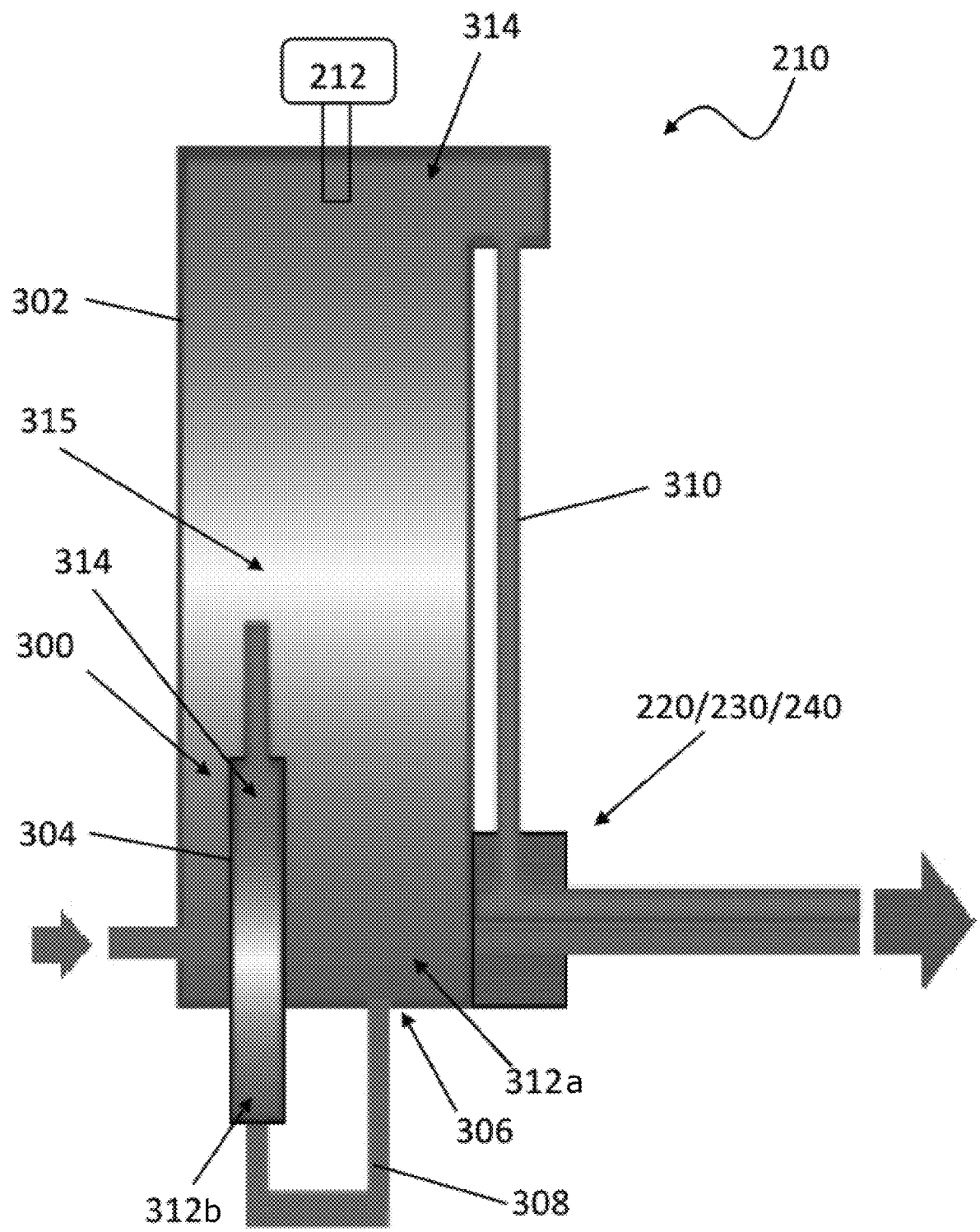
FIG. 3 is a cross-sectional side view of an exemplary water tank that may be incorporated in the schematic of FIG. 2.

FIG. 3 illustrates the tank 210 having an exemplary flow through heater 300, according to one or more embodiments. The flow-through heater 300 is in communication with the TCU 200 such that its operation may be controlled by instructions programmed into the TCU 200 and/or feedback provided to the TCU 200, for example, from the thermocouple 212. Here, the flow-through heater 300 is installed in a reservoir 302 of the tank 210, and the flow-through heater 300 includes a flow-through heating element 304 that extends upward through the reservoir 302. The reservoir 302 includes a port 306 at the bottom thereof that feeds cooler water located at lower regions of the reservoir 302 into the flow-through heating element 304 via a conduit 308. The flow-through heating element 304 thus deposits warmed water above the lower regions of the reservoir 302 and, as this warmed water exits the flow-through heating element 304, relatively cooler water in lower regions of the reservoir 302 is syphoned into the conduit 308 via the port 306, and into the flow-through heating element 304 (where it is heated), thereby creating a thermosiphon pumping action within the reservoir 302. In one embodiment, following a ten (10) second draw of water from the reservoir 302 at one hundred and fifteen degrees (115°) Fahrenheit ("F") and at one half (0.5) gallon per minute ("GPM"), the flow-through heater 300 is configured to heat newly re-filled water therein (i.e., recovery) from a temperature of sixty degrees Fahrenheit (60° F.) to one hundred and fifteen degrees Fahrenheit (115° F.) in just over four (4) minutes. Thus, the flow-through heater 300 may provide rapid recovery times when heating ambient temperature water entering the combined device 100 to operating temperatures. In addition, heated water exits the reservoir 302 via an outlet conduit 310 that, as described below, directs the heated water to a mixing chamber of the servo valve 230. In the illustrated example, interior portions of the reservoir 302 and the flow-through heating element 304 are illustrated with color gradient to represent cooler regions 312a,312b and warmer regions 314 of the reservoir 302 and the flow-through heating element 304 that form towards their lower and upper ends, respectively, such that warmer water from the warmer region 314 flows through outlet conduit 310 and cooler water from the cooler region 312a enters the lower portion of the flow-through heater 300 via the port 306 and the conduit 308. In particular, cooler water enters the reservoir 302 and aggregates at the cooler region 312a thereof, and this cooler water is pulled into the flow-through heater 300 via the port 306 and conduit 308. Cooler water pulled into the flow-through heater 300 enters the lower portion to thereby form the cooler region 312b of the heating element 304. The heating element 304 warms such cooler water as it flows through the flow through heater 300, thereby forming warmer region 314 proximate to the upper portion and/or outlet of the heating element 304, wherein such warmer region 314 of the heating element 304 has relatively warmer water than the relatively cooler water entering the heating element 304 via the conduit 308 which carries the relatively cooler water into the heating element 304. The relatively warmer water exiting flow-through heater 300 enters the reservoir 302 and accumulates near an upper end thereof to form the warmer region 314 thereof. Accordingly, warmer water accumulates at the upper end of the reservoir 302 to define the warmer region 314 and relatively cooler water accumulates at the lower end of the reservoir 302 to define the cooler region 312a, thereby forming an intermediate temperature region 315 between the cooler region 312a and the warmer region 314 with the intermediate temperature region 315 being defined by a thermal gradient existing between the cooler region 312a and the warmer region 314. Similarly, a thermal gradient is formed within an intermediate temperature region 315 of the flow-through heater 300, between the cooler region 312b thereof and the warmer region 314 thereof. In FIG. 3, the thermal gradient existing between the lower end and upper end of both the flow-through heater 300 and the reservoir 302 is depicted using grayscale shading, with darker shadings at the bottom of those elements to indicate the cooler regions 312a,312b thereof, and with darker shadings at the upper end of those elements to indicate the warmer regions 314 thereof, and with varying degrees of lighter shadings between cooler and warmer regions 312,312b,314 to represent the thermal gradient existing there-between in the column of water (i.e., the temperature of the water column warmer gradually increases towards the top of the water column). For this reason, water exiting the outlet conduit 310 is shaded similar to the water existing in the water column at the warmer region 314, to represent relatively warmer water being output from the reservoir 302.

As mentioned, the combined device 100 also includes the thermocouple 212 for measuring the temperature of the water within the reservoir 302 of the tank 210. Here, the thermocouple 212 is in communication with the TCU 200 such that data indicative of water temperature within the tank 210 is transmitted to the TCU 200. In addition, the TCU 200 communicates with the heating element 304 of the tank 210 such that the temperature of the heating element 304 is controllable. For example, the TCU 200 may turn the heating element 304 on or off, and may set or vary the temperature at which the heating element 304 heats water within the reservoir 302. The heating element 304 and the thermocouple 212 may communicate with the TCU 200 via a variety of wired and/or wireless communication technologies. In the illustrated embodiment, the TCU 200 communicates with the heating element 304 and the thermocouple 212 via a first and second of the electrical connections 208.

The tank 210 may also be configured to sense or determine the water level within the reservoir 302. In one embodiment, the tank 210 includes a level sensor that communicates with the TCU 200. Once the reservoir 302 is filled with a sufficient amount of ambient temperature water, the TCU 200 will sense the water temperature therein via the thermocouple 212 and, depending on the sensed water temperature, the TCU 200 may activate the heating element 304. When activated, the heating element 304 continues to heat the volume of water within the reservoir 302 until the thermocouple 212 senses that the water within the reservoir 302 has reached a pre-set temperature and communicates that information to the TCU 200.

Referring to FIG. 2, the water supply 200 supplies ambient temperature water to the combined unit 100 via the inlet 120. As detailed above, ambient temperature water is directed from the inlet 120 into the tank 210. However, before entering the tank 210, at least some of the incoming ambient temperature water pressure and flow is diverted away from the tank 210 and directed towards both the torque motor valve 220 and the servo valve 230, respectively.

With regard to the torque motor valve 220, ambient temperature water is diverted to the torque motor valve 220. In the illustrated embodiment of FIG. 2, the ambient temperature water passes through the filter 222 before entering the torque motor valve 220, as the torque motor valve 220 may be susceptible to contamination build-up that may otherwise obstruct water flow through the orifices therein. Thus, the filter 222 may be utilized to keep the orifices of the torque motor valve 220 clean and inhibit obstructions within the orifices thereof.

Figure 4:
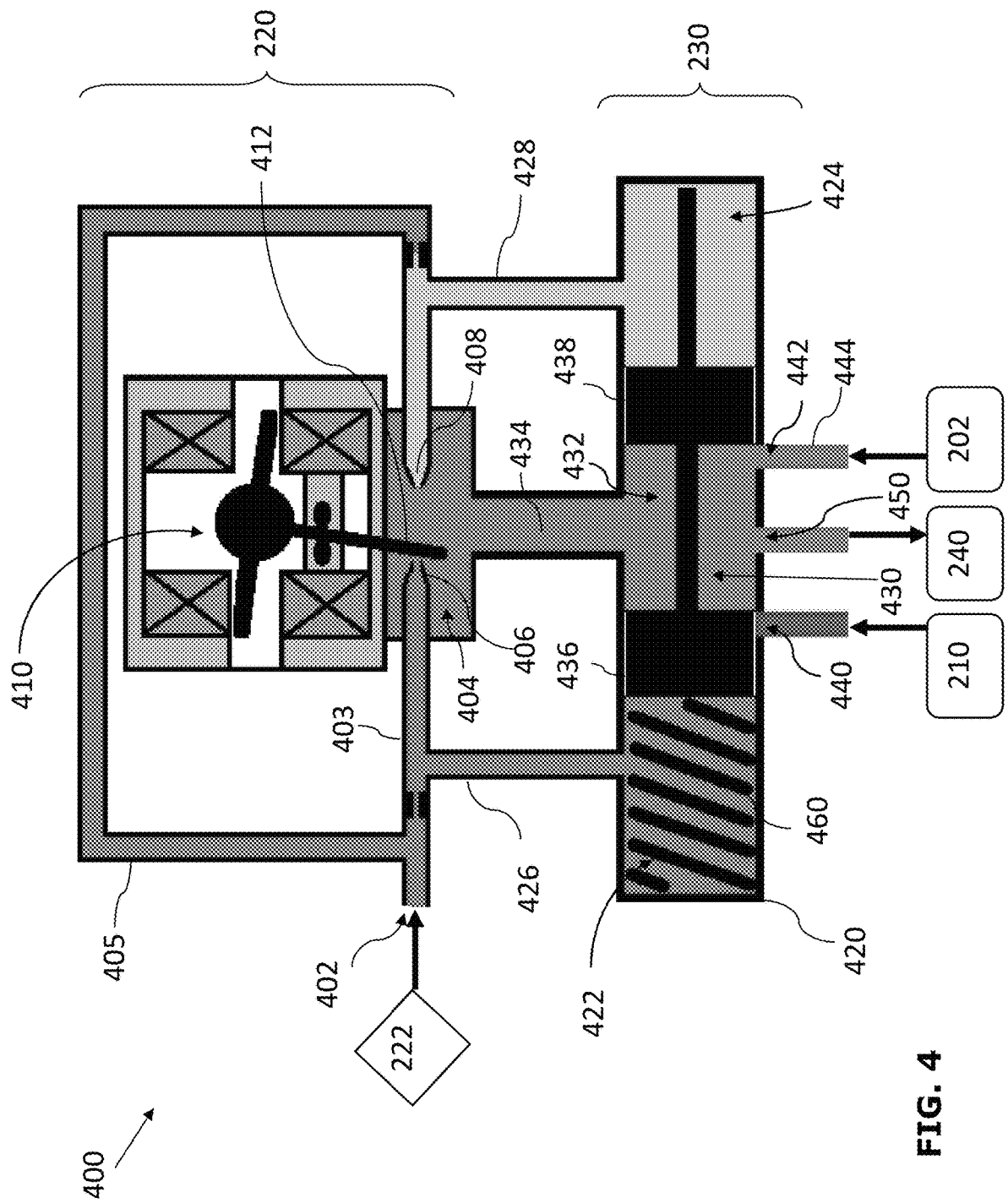
FIG. 4 is a cross-sectional side view of an exemplary torque motor valve and servo valve that may be incorporated in the schematic of FIG. 2.

The torque motor valve 220 and the servo valve 230 may together function as a thermal mixing valve and, in some embodiments, the torque motor valve 220 and the servo valve 230 are thus provided in a single assembly. In other embodiments, however, they may be separately provided. FIG. 4 illustrates an exemplary torque motor valve and servo valve 400 that may be utilized with the combined device 100, according to one or more embodiments. As hereinafter described, the torque motor valve and servo valve 400 (hereinafter, the "TMV/SV 400") is a combination of the torque motor valve 220 and the servo valve 230 and performs the function of a thermal mixing valve. The TMV/SV 400 controls the outlet water temperature to an adjustable range of ambient temperature water up to a maximum temperature. As described below, ambient temperature water and hot water from the tank 210 is ported into the TMV/SV 400 and metered therein via the servo valve 230 portion of the TMV/SV 400. Water of different temperature flows into the various components of the TMV/SV 400 and FIG. 4 illustrates and example operation of the TMV/SV 400 having different temperature water flowing through the conduits or portions thereof and, depending at which conduits or portions of the TMV/SV 400 through which such different temperature water is flowing, the water may be at different pressure so as to form a pressure gradient therein.

In the illustrated embodiment, the torque motor valve 220 portion of the TMV/SV 400 includes a conduit 402 that directs ambient temperature water from the filter 222 into a flapper chamber 404 or the servo valve 230 portion of the TMV/SV 400. As ambient temperature water enters the conduit 402, it may travel directly into a first section of the flapper chamber 404 via a conduit 403 and through a first nozzle 406, or it may be diverted into a second section of the flapper chamber 404 (that is opposite from the first section of the flapper chamber 404) via via a conduit 405 and through a second nozzle 408, or it may be diverted into a chamber of the servo valve 230 portion as described below.

The torque motor valve 220 portion of the TMV/SV 400 also includes an armature 410 having a flapper portion 412 extending therefrom and magnets and coils arranged around the armature. The magnets and coils are electrically connected to the TCU 200, for example, via the electrical connections 208, to receive variable current. This variable current sent to the magnets and coils of the torque motor valve 220 portion of the TMV/SV 400 may be varied depending on the temperature settings adjusted or set at the faucet 204, as described below. Depending on the current applied, the armature 410 will be actuated between the magnets and coils, causing the flapper 412 extending therefrom to move towards or away from the first or second nozzle 406,408. Thus, the flapper 412 may be actuated into a first position to block the first nozzle 406 such that ambient temperature water is diverted to the servo valve 230 portion and to the second nozzle 408, but not through the first nozzle 406 which is blocked (or at least partially impeded or regulated) by the flapper 412. Alternatively, the flapper 412 may be actuated into a second position to block the second nozzle 408 such that ambient temperature water is diverted to the servo valve 230 portion and to the first nozzle 406, but not through the second nozzle 408 which is blocked (or at least partially impeded or regulated) by the flapper 412.

In the illustrated embodiment, the servo valve 230 portion of the TMV/SV 400 includes a sleeve 420 that is hollow and includes an interior volume having a first chamber 422 at a first end thereof and a second chamber 424 at a second end thereof (that is opposite of the first end and the first chamber 422). Ambient temperature water is fed into the first chamber 422 via a first conduit 426 that is proximate to the first nozzle 406 in the torque motor valve 220 portion of the TMV/SV 400, and ambient temperature water is fed into the second chamber 424 via a second conduit 428 that is proximate to the second nozzle 408 in the torque motor valve 220 portion of the TMV/SV 400.

The servo valve 230 portion of the TMV/SV 400 also includes a spool 430 disposed within the sleeve 420, and the spool 430 is configured to slide therein between the first and second chamber 422,424. The spool 430 includes individual spool members or barriers 436,438 having diameters that correspond with the internal diameter of the sleeve 420. In the illustrated embodiment, the spool 430 has two (2) spool members 436,438 at opposing ends thereof, which are dimensioned with equal diameters to isolate the first and second chambers 422,424, such that a differential pressure may form (i.e., where the control pressure in the first chamber 422 is different than the control pressure in the second chamber 424). As described below, the differential pressure will cause the spool 430 to move within the sleeve 420 and vary the volume of the first and second chambers 422,424. The two spool members 436,438 of the spool 430 also define a central chamber or third chamber 432 of the sleeve 420 that extends between the spool members 436, 438. The third chamber 432 is fluidly connected to the flapper chamber 404 via a flapper conduit 434, such that the third chamber 434 is at least partially filled with fluid from either the first or second nozzle 406,408 via the flapper conduit 434.

The third chamber 432 is configured as a mixing chamber. In the illustrated embodiment, warm or hot water from the tank 210 (warmed by the flow through heater 300) is directed by the outlet conduit 310 and fed into the third chamber 432 via a warm water inlet 440. Also, ambient temperature water (that was not directed into the tank 210 or towards the filter 222 of the torque motor valve 230) is fed into the third chamber 432 through a cold water inlet 442, via a cold water conduit 444 that leads from the water supply 202. The warm water fed into the third chamber 432 by the warm water inlet 440 is mixed in the third chamber 432 (i.e., the third chamber 432 is a mixing chamber) with the ambient temperature water fed into the third chamber 432 via the cold water inlet 442, and the mixed temperature water leaves the servo valve 230 portion of the TMV/SV 400 via a mixed water outlet 450. Mixed temperature water exiting the third chamber 432 via the mixed water outlet 450 is directed to the shut-off valve 240.

The spool 430 is biased within the sleeve 420. Here, a spring 460 is provided in the first chamber 422 of the sleeve 420, and the spring 460 biases the spool 430 towards the second chamber 424. Also, the spool members 436,438 of the spool 430 are configured to slide over the warm water inlet 440 and cold water inlet 442, and effectively close (or shut off) the warm water inlet 440 and cold water inlet 442 when disposed there-over. Here, the spool member 436 is configured to obstruct the warm water inlet 440 and the spool member 438 is configured to obstruct the cold water inlet 442. Thus, the spool members 436,438 may slide over all or a portion of either of the warm water inlet 440 and/or cold water inlet 442 to stop or merely limit the amount of warm and/or cold water entering the third chamber 432.

In the illustrated embodiment, the spring 460 biases the spool 430 such that one of the spool member 436 of the spool 430 completely closes the warm water inlet 440 when current is not provided to the torque motor valve 220 portion of the TMV/SV 400 via the TCU 200. Thus, the TMV/SV 400 may be configured to inhibit flow of hot water from the mixed water outlet 450 as a default setting to which it may revert, for example, when unpowered or in the event of failure. In such exemplary default setting, only ambient temperature water via the cold water inlet 442 (and the flapper conduit 434) is "mixed" in the third chamber 443 such that cool water is outputted from the mixed water outlet 450 when water output is requested by the end user. However, the TCU 200 may later send current to torque motor valve 220 portion of the TMV/SV 400 to increase pressure in the second chamber 424 of the sleeve 420 to counteract the biasing force of the spring 460. That pressure differential may be sufficient to overcome the preload of the spring 460, causing the spool 430 to migrate towards the first chamber 422 of the sleeve 420, and thereby at least partially open the warm water inlet 440 to allow at least some warm water from the warm water inlet 440 to enter into, and be mixed in, the third chamber 432. The amount of control pressure provided in the second chamber 424 of the sleeve 420 will determine how far the spool member 436 slides over (and un-obstructs) the warm water inlet 440. As greater control pressures are provided in the second chamber 424, the warm water inlet 440 will become less obstructed and more warm water will be permitted to enter the third chamber 432 via the warm water inlet 440. Thus, cold and hot water are ported into the third chamber 432 (i.e., the mixing chamber) via the warm and cold water inlets 440,442 and metered therein via the spool 430, wherein the position of the spool 430 within the sleeve 420 is modulated by the torque motor valve 220 portion of the TMV/SV 400.

Accordingly, the TMV/SV 400 controls the outlet water temperature of the faucet 204 between a range of temperatures. This range of temperatures depends upon the temperature of the ambient temperature water provided by the water source 202 and the maximum temperature that the tank 210 is configured to heat the water. Thus, the lower bound of the range of temperature is that of the water source 202 and the upper bound is the maximum temperature at which the tank 210 is configured to heat the water. The TMV/SV 400 may be adjusted to vary this range of temperatures as well. For example, the spool members 436,438 may be arranged such that the hot water inlet 440 is never fully open and/or arranged such that the cold water inlet 442 is never fully closed, thereby inhibiting the mixed water outlet 450 from outputting only hot water from the hot water inlet 440 and/or ensuring that at least some ambient temperature water from the cold water inlet 442 is always being mixed with the hot water from the hot water inlet 440.

In use, the end user will engage the faucet 204 to draw water therefrom. In one embodiment, the user may adjust the temperature of the water exiting the faucet 204 between a range of temperatures (e.g., from ambient water temperature of the water source 202 to 108° F.), whereas in other embodiments the outlet temperature is fixed at a single temperature, or the user has the ability to switch between one or a few set temperatures. The faucet 204 generates a signal that correlates to a temperature control value sensed by the TCU 200. For example, the TCU 200 may sense a temperature control value associated with a certain voltage change (e.g., drop) across the IR sensor of the faucet 204 and, in response, generate a variable output that is associated with the temperature control value. Here, the TCU 200 detects voltage drop in the IR sensor of the faucet 204 and, in response, generates a variable current that, in one embodiment, ranges from zero (0) to one hundred (100) milliamperes ("mA").

The TCU 200 senses the temperature adjustment value from the faucet 204 via the CAN BUS (and through the electrical connection 134). The temperature adjustment value correlates to the water temperature selected by the user to be output from the faucet 204. Where the faucet 204 is temperature adjustable by the user, the faucet 204 will send a temperature adjustment value to the TCU 200, where the value of the temperature adjustment value depends on the faucet 204 outlet temperature selected by the user. The TCU 200 senses the temperature adjustment value received from the faucet 204 and processes the temperature adjustment value to generate the variable current that will be applied to the torque motor valve 220 of the TMV/SV 400. The magnitude of the current generated by the TCU 200 may vary depending on the magnitude of the temperature adjustment value received from the faucet 204 and, in one embodiment, ranges from zero (0) to one hundred (100) milliamperes ("mA"), or even from zero (0) to one hundred (100) mA with each current value within that range corresponding with a faucet 204 outlet temperature.

In response to sensing the temperature adjustment value, the TCU 200 sends the variable current to the TMV/SV 400 via one of the electrical connections 208. Depending on the amount of amperes sent to the TMV/SV 400, the torque motor valve 220 proportionately drives the armature 410 in one direction or another (e.g., rotating the armature 410 either clockwise or counter clockwise), thereby swinging the flapper portion 412 extending therefrom (e.g., swinging the flapper portion 412 either to the left or to the right) between the nozzles 406,408. The position of the flapper portion 412 within the flapper chamber 404 proportionally affects the control pressure experienced within the first and second chambers 422,424 of the servo valve 230 portion, and the control pressure in the first and second chambers 422,424 proportionally opens and/or closes the warm and cold water inlets 440,442.

Thus, the water pressure in the first and second chambers 422,424 of the servo valve 230 portion depends on the position of the flapper portion 412 in the flapper chamber 404, and the amount to which the flapper portion 412 obstructs (or even fully closes) either of the nozzles 406,408. When the flapper portion 412 is moved fully to the left, it covers the first nozzle 406, causing ambient temperature water from the conduit 402 (leading from the filter 222) to enter the first chamber 422 of the sleeve 420 via the conduit 426, but bypass the first nozzle 406 such that the ambient temperature water enters both the flapper chamber 404 via the second nozzle 408 and the second chamber 424 of the sleeve 420 via the conduit 428. Here, the control pressure within the second chamber 424 is not sufficient to overcome the biasing force or preload of the spring 460, which would move the spool member 436 of the spool 430 to the left and at least partially open the warm water inlet 440 such that warm water is mixed into the water exiting via the mixed water outlet 450. However, in this situation, the other spool member 438 does not obstruct or only partially obstructs the cold water inlet 442 such that all or substantially all of the water exiting the mixed water outlet 450 is from the cold water inlet 442. When the flapper portion 412 is moved towards the right, the first nozzle 406 becomes un-obstructed such that ambient temperature water from the inlet 402 may enter the flapper chamber 404 via the first nozzle 406, which in turn reduces the control pressure experienced in the first chamber 422 of the servo valve 230 portion and creates a pressure differential sufficient to overcome the spring 460 preload. Here, ambient temperature water is also entering the second chamber 424 of the servo valve 230 portion as described above, but the control pressure experienced in the second chamber 424 is greater than the pressure in the first chamber 424 and sufficient to migrate the spool member 436 and at least partially open the warm water inlet 440 (and may even move the spool member 438 to at least partially close the cold water inlet 442), such that an amount of warm water enters the third chamber 432 where it may be mixed (i.e., with ambient temperature water from the cold water inlet 442) and exit via the mixed water outlet 450. When the flapper portion 412 is moved fully to the right such that it covers the second nozzle 408, the control pressure in the second chamber 424 is maximized and forces the spool 430 to its extreme position (e.g., the spool members 436,438 are moved to their left most position within the sleeve 420), where the warm water inlet 440 is fully opened (or, where it is not designed to be fully opened, opened to the fullest amount possible in the particular application) and the cold water inlet 442 is fully closed (or, where it is not designed to be fully closed, obstructed to the fullest amount possible in the particular application), such that a maximum amount of warm water enters the third chamber 432 where it may be mixed (with ambient temperature water from the cold water inlet 442, for example, where the cold water inlet 442 is designed to remain at least partially open) and exit via the mixed water outlet 450. To fine tune the pressure in the system, conduits may be configured to constrict or increase flow to effect flow pressure in the system. For example, the conduits 403,405 may each be configured to constrict flow up-stream of the conduits 426,428. In the illustrated example, a first constrictor is provided in the conduit 403 downstream of the branching of the conduit 405 and immediately upstream of the conduit 426, and a second constrictor is provided in the conduit 405 immediately upstream of the conduit 428.

Thus, the user selects a water temperature at the faucet 204, which sends a temperature adjustment value to the TCU 200. The TCU 200 then sends a variable current that corresponds to the temperature adjustment value to the torque motor valve 220. The torque motor valve 220 then modulates the control pressure within the servo valve 230, creating a pressure differential that corresponds to the amount of current received from the TCU 200 and causes the spool 420 to migrate within the servo valve 230 to a position where the temperature of the water flowing out of the mixed water outlet 450 is the temperature selected by the user at the faucet 204. Accordingly, the position of the spool 420 within the servo valve 230 is determined by the temperature adjustment value selected by the user at the faucet.

In some embodiments, the TCU 200 may further control or fine-tune the temperature of water output from the mixed water outlet 450 based on feedback in the form of temperature measurements from the faucet thermocouple 244 that measures the temperature of water exiting the faucet 204. Thus, if the TCU 200 determines that the temperature of the water flowing out of the faucet 204, as measured by the faucet thermocouple 244, is not equal (or within a permitted or suitable range of) the temperature selected by the user at the faucet, the TCU 200 may increase or decrease the current that it sends to the torque motor valve 220 to further adjust the temperature of the water exiting the mixed water outlet 450. In addition, the TCU 200 may adjust the temperature at which the tank 210 heats the water based on feedback from the faucet thermocouple 244. Accordingly, the TMV/SV 400 permits the faucet 204 to output water at the user-selected temperature, and to maintain that hot water output until the hot water supply has been exhausted. In addition, the TMV/SV 200 enables control of the outlet 204 water temperature and increases draw time of the same since the water inside the tank 210 may be at a higher temperature than the user selected temperature desired at the faucet 204.

The TMV/SV 400 may provide several benefits to the combined device 100. First, the combined device 100 may increase water draw times from the faucet 204 by heating the water within the tank 210 to relatively higher temperatures and blending it with cold water within the TMV/SV 400 that is integrated within the combined device 100. For example, the tank 210 may be adjusted to heat water within the reservoir 302 to temperatures in excess of one hundred and fifty degrees Fahrenheit (150° F.). Heating water to higher temperatures inhibits or eliminates growth of bacteria, such as the *Legionellae pneumophila* bacteria, when compared to other designs where water is heated to temperatures that are less than one hundred and fifty degrees Fahrenheit (150° F.). Also, the TMV/SV 400 may protect users from being scalded by excessively hot water at the faucet 204. For example, by integrating the TMV/SV 400 into the combined device 100, the combined device 100 may ensure that water exiting the faucet 204 does not exceed scalding temperatures, for example, temperatures of, or in excess of, one hundred and forty degrees Fahrenheit (140° F.). In addition, the TMV/SV 400 is integrated into the design of the combined device 100, thereby facilitating installation and maintenance.

Mixed temperature fluid exits mixed water outlet 450 of the TMV/SV 400 and is directed to the shut-off valve 240. The shut-off valve 240 may be controllable by the TCU 200. In addition, the shut-off valve 240 may be a sub-assembly of the combined device 100 and integrated therein. Various types of shut-off valves may be utilized for the shut-off valve 240, for example, solenoid shut off valves that are controlled by the TCU 200. In the illustrated embodiment, however, the shut-off valve 240 is configured as a solenoid shut-off valve having bleed-drain functionality.

Figure 5:
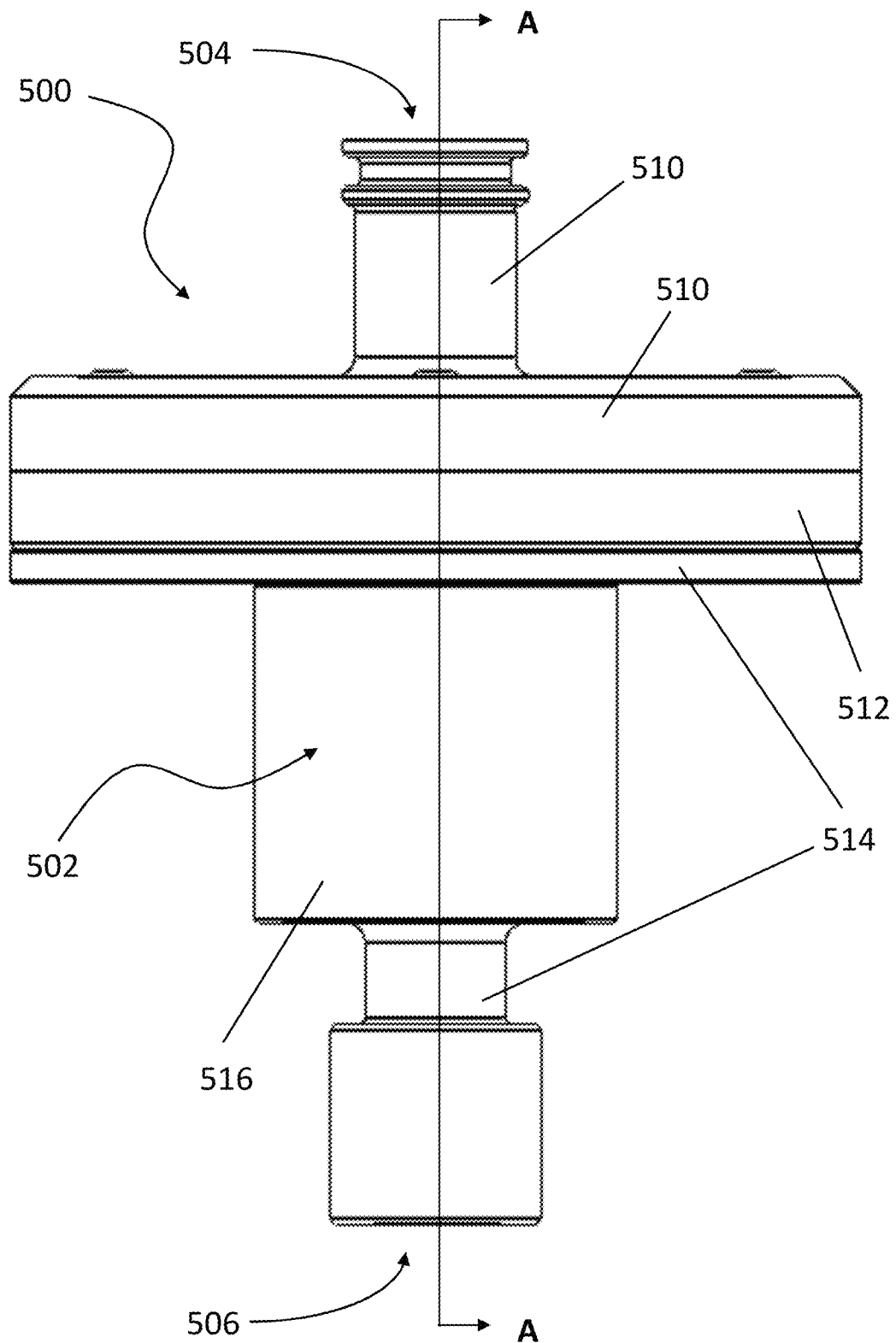
FIG. 5 is a side view of an exemplary shut-off valve that may be incorporated in the schematic of FIG. 2.

FIG. 5 illustrates an exemplary shut-off valve 500 that may be integrated into the combined device 100 and that is configured as a dual solenoid shut-off valve and bleed-drain valve, according to one or more embodiments. As described below, the shut-off valve 500 is configured as a spring biased, direct acting, normally closed, 2-way, 2-position, energize to open, tubular type solenoid valve. In the illustrated embodiment, the shut-off valve 500 includes a housing 502 having an inlet 504 and an outlet 506. The inlet 504 of the shut-off valve 500 is connected to the mixed water outlet 450 of the TMV/SV 400, and the outlet 506 of the shut-off valve 500 leads to the outlet 122 of the combined device 100, to which the faucet 204 is connected. In use, mixed water from the TMV/SV 400 flows from the mixed water outlet 450 thereof into the inlet 504 of the shut-off valve 500, through an interior of the shut-off valve 500 and exiting the outlet 506 thereof, and to the faucet 204.

Also, the housing 502 may be a one-part housing, or may instead be comprised of several components that together define the housing 502. In the illustrated embodiment, the housing 502 includes several components, retainers, or caps, that are secured together to house the various internal components of the shut-off valve 500 and, therefore, is a multi-component housing. Here, the housing 502 includes an inlet fitting 510, a diaphragm stop member 512, an outlet fitting 514, and a case 516. In this embodiment, the inlet fitting 514 is a member that defines the inlet 504, and the outlet fitting 514 is a member that defines the outlet 506. In addition, the outlet fitting 514 includes various recesses or interior channels, including a recess or chamber configured to receive a coil or solenoid, as well as a channel configured to receive an armature (see FIG. 6, below). The case 516 is secured over the outlet fitting 514 so as to enclose the recess or chamber configured to receive a coil or solenoid, such that the solenoid components thereon are housed within the shut-off valve 500 and impervious to water. The magnetic components utilized in the shut-off valve 500 may be made from 430$f$ corrosion resistant steel such that plating is not required; however, other materials may be utilized with or without plating. Also, diaphragm stop member 512 is positioned between the inlet fitting 510 and the outlet fitting 514, and these components are assembled together via a plurality of retainers such as screws. Moreover, the inlet fitting 510 and the diaphragm stop member 512 each define interior surfaces that, when assembled together with the outlet fitting 514 as described and illustrated herein, form a diaphragm chamber within the shut-off valve 500. In addition, the various internal components of the shut-off valve 500 may include polytetrafluoroethylene coatings or materials to prevent mineral deposits.

Figure 6:
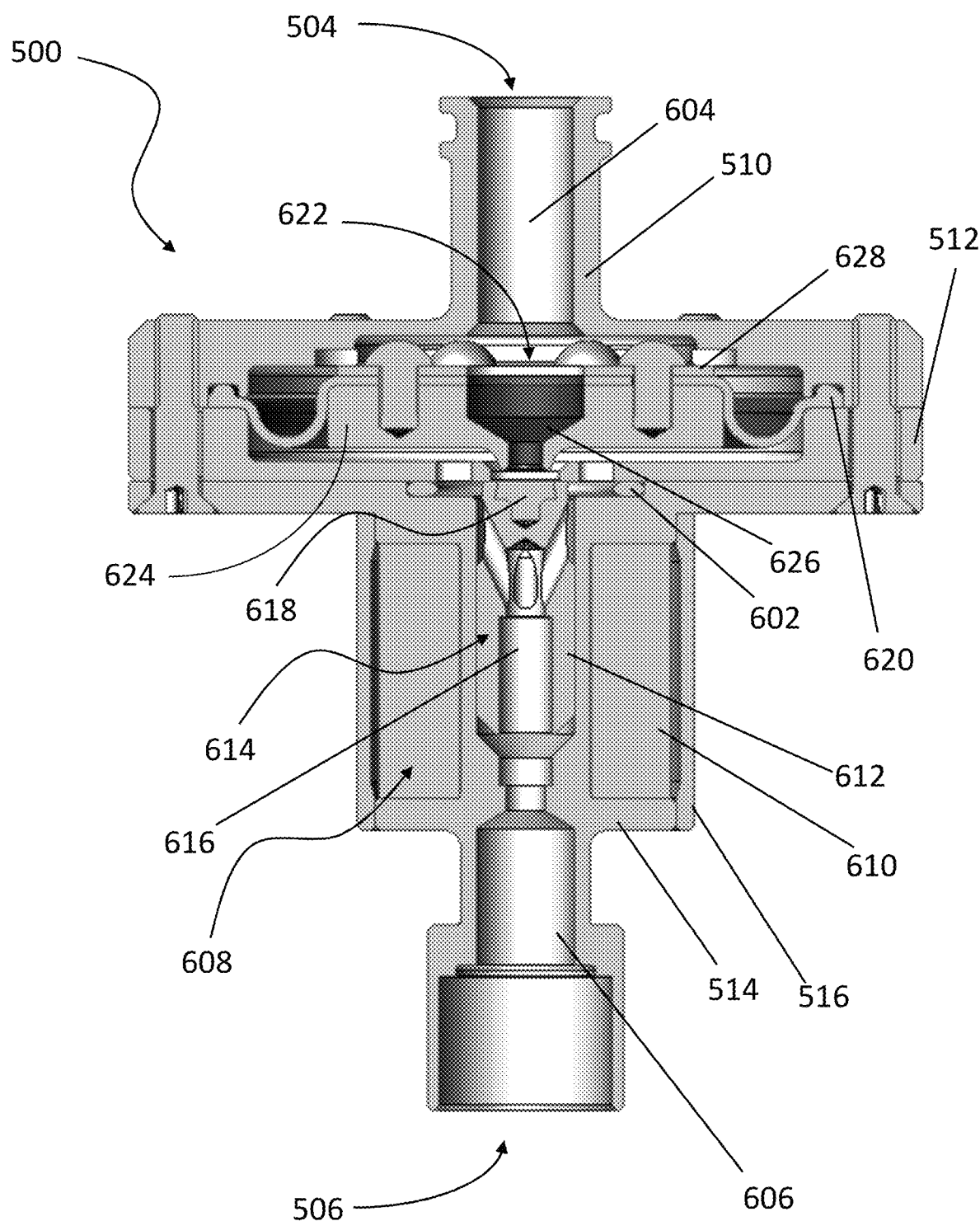
FIG. 6 is a cross-sectional side view of the shut-off valve of FIG. 5 taken along line A-A.

FIG. 6 is a cross-sectional side view of the shut-off valve 500 of FIG. 5 along section line A-A, and illustrates the interior of the shut-off valve 500. When assembled, a seal or O-ring 602 is provided between the stop member 512 and the outlet fitting 514 to form a fluid tight connection therebetween and, as detailed below, a diaphragm member is disposed between the inlet fitting 510 and the stop member 512 to form a fluid tight connection there-between.

As illustrated, the inlet fitting 510 defines an inlet channel 604 that extends from and is in communication with the inlet 504, and the outlet fitting 514 defines an outlet channel 606 that is in communication with the outlet 506. In addition, the outlet fitting 514 defines a solenoid recess 608 that is configured to receive a coil 610, and the case 516 encloses the coil 610 within the solenoid recess 608. The coil 610 may be energized by the TCU 200.

The outlet fitting 514 also defines an armature channel 612. As illustrated, an armature assembly 614 is disposed within the armature channel 612 and arranged to slide therein. The armature assembly 614 includes an armature 616 and a plug 618 attached thereto. In the illustrated embodiment, the plug 618 is an elastomeric member that is molded onto the armature 616; however, it may be differently attached and include different materials. Also in the illustrated embodiment, a biasing element (not illustrated) is arranged within the armature channel 612 and biases the armature assembly 614. The biasing element may include various types of biasing elements, such as, for example, springs, elastomeric members, etc. Here, the biasing element is a spring made from 316 corrosion resistant steel that biases the armature assembly 614 in an extended position within the armature channel 612, such that the plug 618 is urged towards the inlet 504 of the shut-off valve 500. When the coil 610 is energized via the TCU 200, the armature assembly 614 may slide into a retracted position within the armature channel 612, such that the plug 618 of the armature assembly 614 is retracted closer to the outlet 506 as compared to when the armature assembly 614 is biased towards the extended position. As detailed below, the "default" position of the armature assembly 614 is thus the extended position where the plug 618 is urged towards a nozzle; however, when the coil 610 is energized, the electromagnetic force generated thereby overcomes the preload of the biasing element to force the armature assembly 614 into the retracted position within the armature channel 612 such that the plug 618 may not engage the valve seat and inhibit any flow of air or water.

The shut-off valve 500 also includes a diaphragm 620 that is arranged within a diaphragm chamber 622 that is defined between the inlet fitting 510 and the diaphragm stop member 512 when assembled together. The diaphragm 620 has an opening or nozzle through which fluid (i.e., water and air) may flow and which may be closed when the plug 618 (of the armature assembly 614) is seated thereon. The diaphragm 620 may be biased in a retracted position such that its nozzle does not engage the plug 618 unless acted upon by water pressure. Here, the diaphragm 620 is made from an elastomeric material that may withstand up to 20 psig without deforming into the extended position. However, the diaphragm 620 may be differently configured.

In the illustrated embodiment, a retainer assembly is provided to secure the diaphragm 620 within the diaphragm chamber 622. Here, the diaphragm assembly includes an upper retainer 624 that is secured to an upper side of the diaphragm 620 and that includes a valve seat 626. The diaphragm assembly may also include a lower retainer 628 that is secured to the lower side of the diaphragm 620, such that the diaphragm 620 is sandwiched between the upper retainer 624 and the lower retainer 628, and secured therein via a plurality of fasteners such as rivets, adhesives, etc.

The valve seat 626 defines a nozzle of the diaphragm 620 through which air and/or water may exit the shut-off valve 500, may flow when spaced away from the plug 618 and inhibit flow of the same when in engagement with the plug 618. Thus, when the diaphragm 620 biases the valve seat 626 in the retracted position, a gap exists between the valve seat 626 and the plug 618 (regardless of whether the armature assembly 614 is in the extended or retracted position). Water pressure pushes the diaphragm 620 and the valve seat 626 extending therefrom towards the plug 618 and, where the armature assembly 614 is in the extended position, the valve seat 626 will engage the plug 618 to close the shut-off valve 500; however, once the coil 610 has been energized to pull the armature assembly 614 into the retracted position, a gap will be exist between the valve seat 626 and the plug 618 to permit flow through the outlet 506 of the shut-off valve 500.

Figure 7:
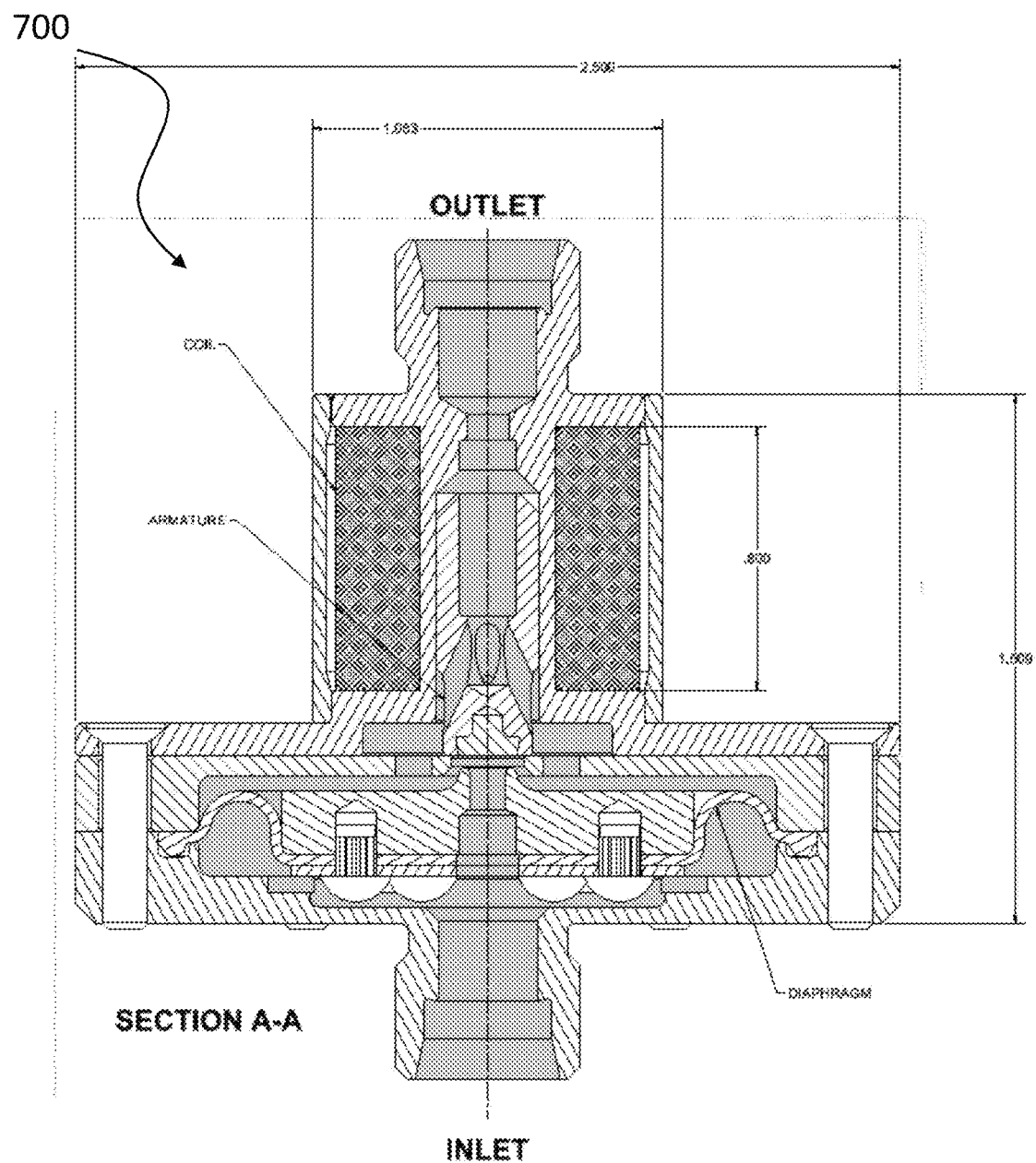
FIG. 7 illustrates the shut-off valve of FIG. 5 depicting example operation in a bleed mode.
Figure 8:
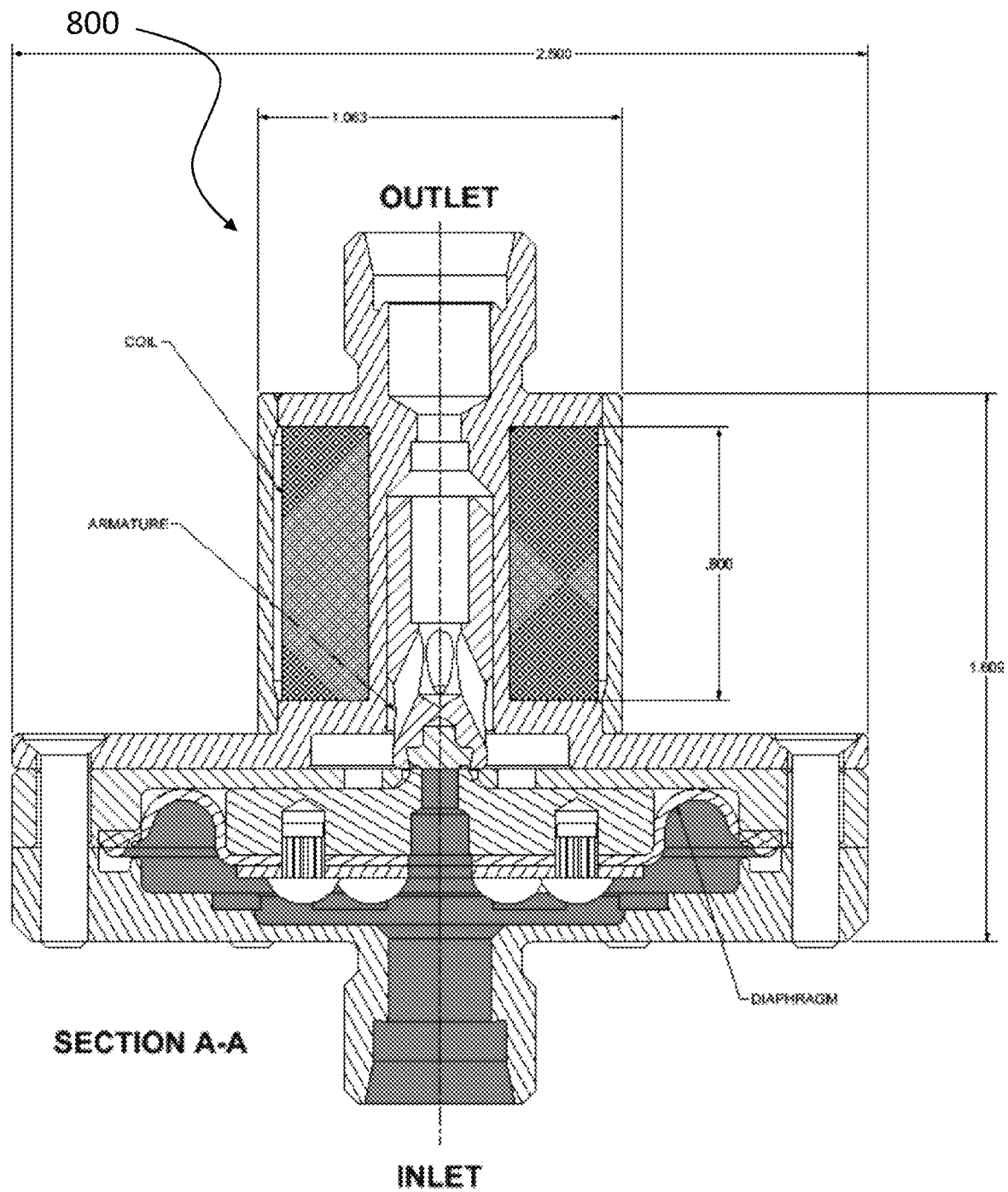
FIG. 8 illustrates the shut-off valve of FIG. 5 depicting example operation in an off mode.
Figure 9:
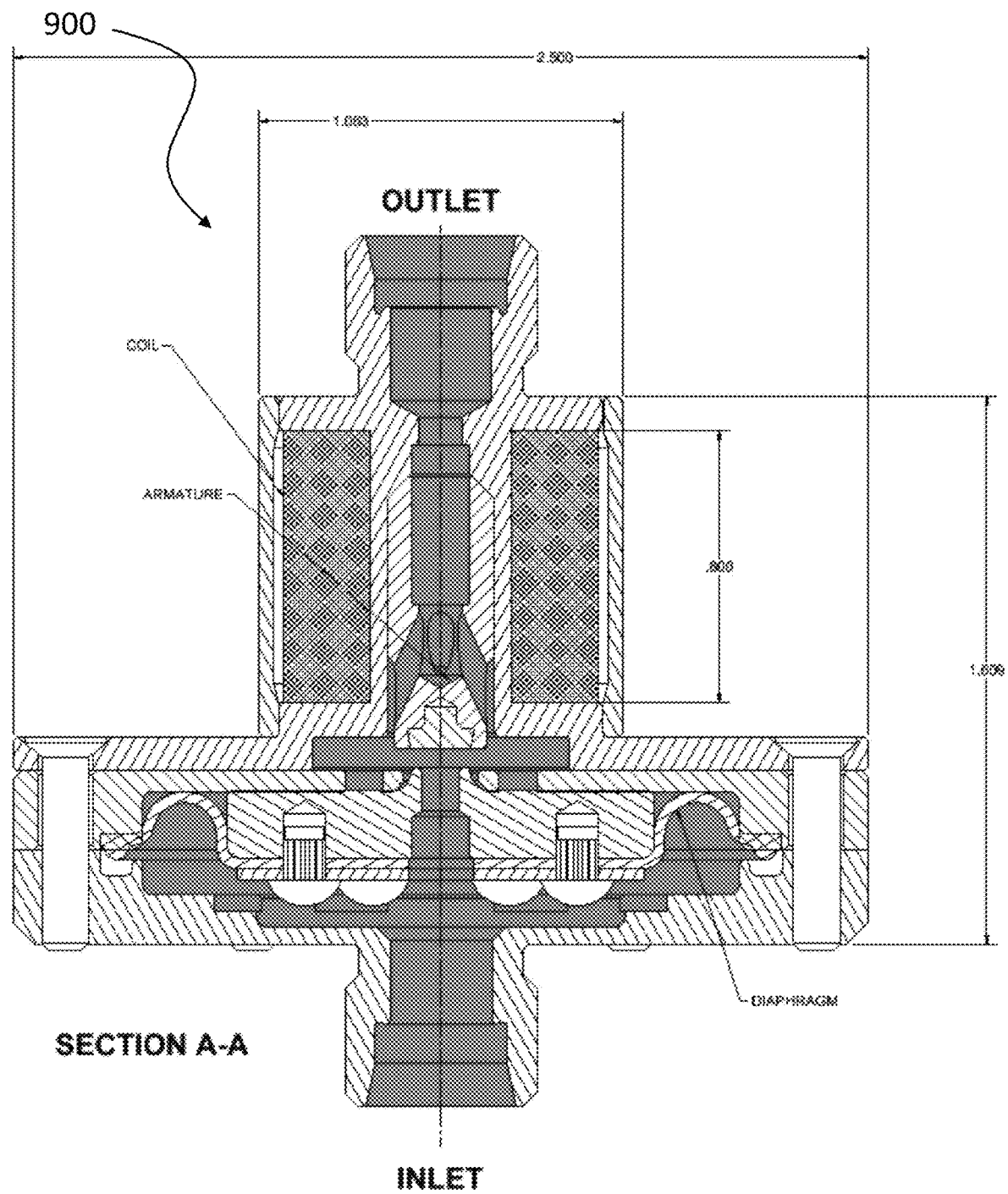
FIG. 9 illustrates the shut-off valve of FIG. 5 depicting example operation in an on mode.

As mentioned, the shut-off valve 500 is configured as a bleed and drain valve, which may in turn facilitate maintenance, draining, installation, etc. Accordingly, the shut-off valve 500 has three modes or conditions. FIGS. 7-9 illustrate the various modes of the shut-off valve 500, according to one or more embodiments. FIG. 7 illustrates an exemplary bleed mode 700, according to one or more embodiments. In the bleed mode 700, the coil 610 is not energized and there is no water pressure flowing through the shut-off valve 500.

Accordingly, the diaphragm 620 is in the retracted position due to the lack of water pressure, and there is a gap between the plug 618 and the valve seat 626 despite the biasing element pushing the armature assembly 614 into the extended position. The bleed mode 700 thus permits air to bleed or vent from the faucet 204 and back through the shut-off valve 500, which aids in filling or draining of the combined device 100. Thus, the bleed mode 700 may be conceptualized as a maintenance mode that is not utilized when the faucet is to be operational.

FIG. 8 illustrates an exemplary off mode 800, according to one or more embodiments. In the off mode 800, the coil 610 is not energized, but the shut-off valve 500 is pressurized, for example, with at least 20 psig of water pressure. Because the coil 610 is not energized, the armature assembly 614 is in the extend position, which thereby positions the plug 618 more proximate to the diaphragm 620. Also, the water pressure flowing through the inlet 504 deforms the diaphragm 620, from the retracted position into an extended position, and thereby extends the valve seat 626 into engagement with the plug 618. Here, the plug 618 is in intimate contact with the valve seat 626, thereby forming a seal that inhibits fluid from exiting the shut-off valve 500. Thus, the off mode 800 may be viewed as the default mode of the shut-off valve 500 when the faucet 204 is operational.

FIG. 9 illustrates an exemplary on mode 900, according to one or more embodiments. In the on mode 900, the TCU 200 has energized the coil 610 after the shut-off valve 500 has been pressurized with at least 20 psig of water pressure. The water pressure deforms the diaphragm 620 such that the valve seat 626 thereon is pushed towards the plug 618 but, because the coil 610 has been energized, the electro-magnetic forces (produced by energization of the coil 510) have pulled the armature assembly 614 into the retracted position. Thus, the plug 618 has been retracted away from the valve seat 626 to form a gap there-between through which fluid may flow. Here, for example, the solenoid moves the plug 618 approximately 0.30 inches away from the valve seat 626, thereby opening the shut-off valve 500 such that water may flow there-through. Thus, the shut-off valve 500 may be switched into the on mode 900 when an end user attempts to draw water from the faucet 204, for example, by waving his/her hands proximate to the IR sensor thereon.

Figure 10:
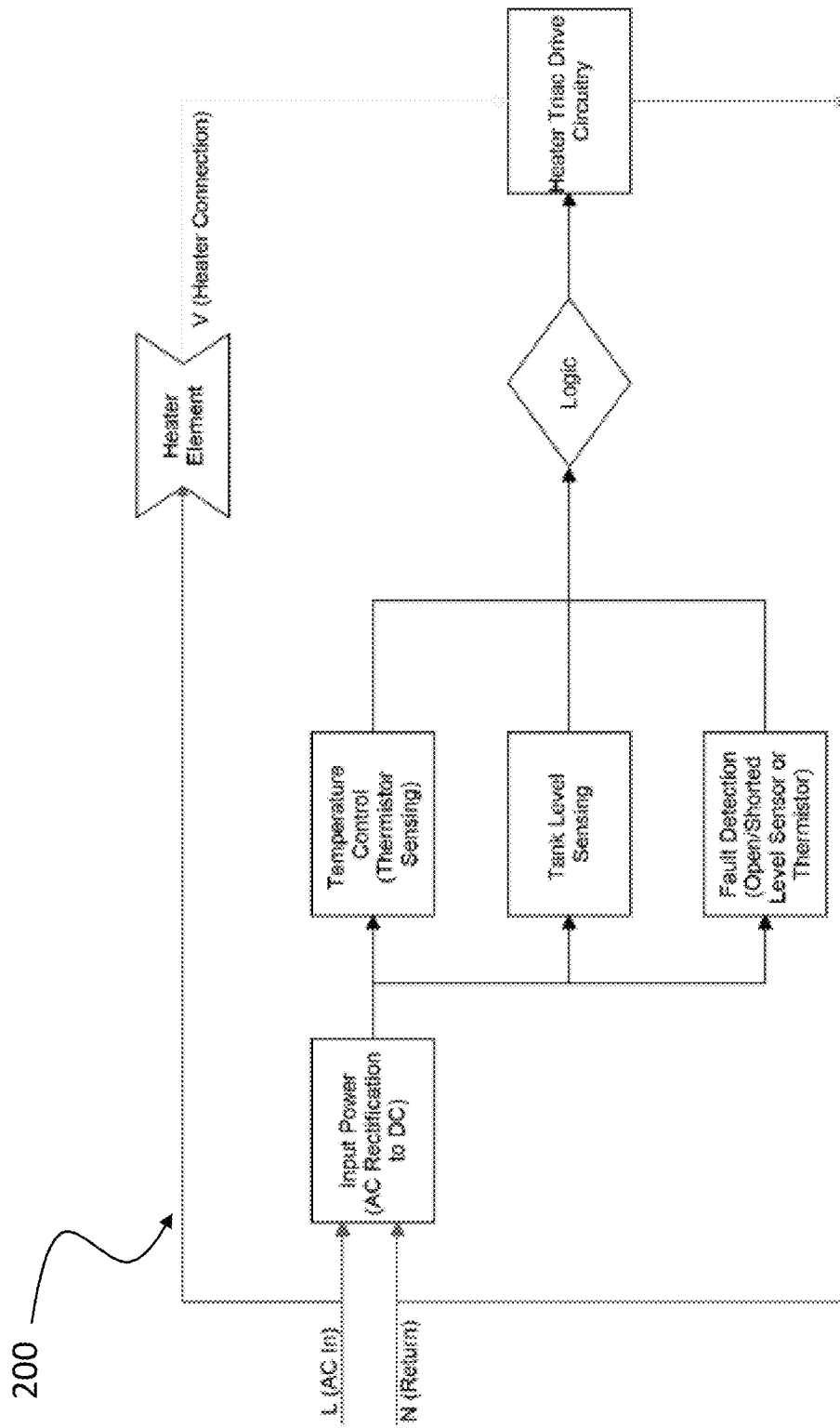
FIG. 10 illustrates a schematic of an exemplary temperature control unit (TCU) that may be incorporated in the schematic of FIG. 2.

The TCU 200 may include various types of controllers. FIG. 10 illustrates an exemplary schematic of the TCU 200, according to one or more embodiments. The TCU 200 may be provided at various locations within or on the combined device 100. In the illustrated embodiment, the TCU 200 is located within the lower section 114 of the combined device 100 to reduce its exposure to heat, and the TCU 200 is mounted to a heat sink that is disposed on a lower face of the reservoir section 110, where the water temperature may range between 55° F. and room temperature. Moreover, all electrical components connected to the TCU 200, such as the various temperature sensors and water level sensors, may be sized to a specified safety factor at the maximum temperature and current draw for a given end use application.

The TCU 200 is a printed circuit board that is populated with surface mounted commercially available COTS items. Here, the TCU 200 is a custom developed electronic assembly configured to switch power to the heating element 304 based on temperature feedback from one or more temperature sensors, such as the tank thermocouple 212 and/or the faucet thermocouple 244. Accordingly, the TCU 200 may maintain the tank water temperature around a given set point with a given hysteresis. In addition, the TCU 200 is configured to open the shut-off valve 500, for example, by energizing the coil 610 to retract the armature assembly 614 as detailed above.

The combined device 100 may include a number of additional features. Some of these additional features may provide protection to maintenance personal responsible for installing or otherwise interacting with the combined device 100. Other such additional features inhibit the combined device 100 from operating in certain conditions that could damage the combined device 100 and/or present dangerous conditions to the environment (e.g., such as an aircraft) in which the combined device 100 is installed. Even other of these additional features may provide over temperature protection, for example, to ensure that end users do not encounter scalding water temperatures at the faucet 204.

The combined device 100 may be configured to protect users from being burnt when touching external surfaces thereof. For example, in some embodiments the external surfaces of the combined device 100 may be covered with an insulator material that remains below a certain temperature, thereby making the combined device 100 safe to touch. In some embodiments, any or all of the reservoir section 110, the upper section 112, and the lower section 114 may be wrapped in an insulation blanket. Various types of insulator materials may be utilized, including without limitation, fiberglass, mineral wool, Polystyrene, Polyisocyanurate, Polyurethane, etc., and combinations of the same. These insulator materials (or combinations of insulator materials) may be utilized in combination with one or more insulation facings, such as a foil. In addition, these insulator materials (or combinations of insulator materials) may be installed on the combined device 100 in a variety of forms, for example, as spray on foams, as a blanket, as a radiant barrier and reflective insulation system, etc. In one example, the reservoir section 110 is fully wrapped in an insulation blanket. In another example, only an exposed portion of the reservoir section 110 (i.e., the portion that is exposed when the combined device 100 is mounted in an aircraft) is wrapped in an insulation blanket.

The combined device 100 may also be configured to prevent "dry operation" so that it does not heat unless there is sufficient water within the reservoir 302. This feature is illustrated in the schematic of FIG. 10. As mentioned above, the TCU 200 may be in communication with a water level sensor that senses the presence of water within the reservoir 302. Here, the TCU 200 may be configured to cut power to the flow-through heater 300 when the TCU 200 determines, via the water level sensor, that the water level within the reservoir 302 is insufficient or if the water therein is frozen. This feature prevents "drop operation" where the heating element 304 is powered without sufficient water level within the reservoir 302.

As mentioned, the pressure relief valve 140 (see FIG. 1) may be provided on the combined device 100 and configured to provide internal pressure relief in the event of unsuitably high internal pressures. The pressure relief valve 140 may extend into the reservoir 302 of the tank 210 and be designed to "unseat" to release pressure from within the reservoir 302 when the internal pressure reaches a designed upper limit. In the illustrated embodiment, the pressure relief valve 140 "unseats" or "cracks" when the pressure within the reservoir 302 reaches pressures of between 130 and 150 psig (or higher) and, in some embodiments, the pressure relief valve 140 may be configured to automatically "resect" when the internal pressures falls to 90 psig or lower. In the illustrated embodiment, the pressure relief valve 140 is provided on the upper section 112 of the combined device 100 and extends into the reservoir 302 of the tank 210 via a top surface thereof. The pressure relief valve 140 may be differently disposed, for example along the periphery of the reservoir 302; however, biofilm buildup on the pressure relief valve 140 may cause leaks, and such buildup may be inhibited by placing the pressure relief valve 140 at a location on the water tank where it is not in constant contact with fluid. The pressure relief valve 140 is an optional feature and, in some embodiments, is not included as the structure of the combined device 100 may be built to withstand pressures in excess of 300 PSIG without damage.

The combined device 100 may also be configured such that the user may manually reset it as needed. Here, for example, the combined device 100 includes a manual reset 156. In some embodiments, the combined device 100 is configured to cut power to the heating element 304 of the flow-through heater 300 when the temperature surpasses a threshold temperature (e.g., at 180° F.+/−8° F.), after which the flow-through heater 300 will remain unpowered until the user reactivates it by engaging the manual reset 156. Thus, the manual reset 156 may be activated to repower the heating element. The manual reset 156 may be provided at various location on the combined device. In some embodiments, the manual reset 156 is configured to be reset externally and thus arranged on an external surface of the combined device 100, for example, on an upper surface of the upper section 112. In other embodiments, the manual reset 156 is configured to be reset internally and provided within the caps of either the upper or lower sections 112,114, such that the operator would remove the caps to engage the manual reset 156. The manual reset 156 may be provided elsewhere about the body of the combined device, however.

In addition, the combined device may include a thermal fuse feature as a fail-safe to provide protection against excessive temperatures. Here, the combined device 100 may include a thermal fuse (not illustrated) that will trip when the reservoir 302 reaches a threshold temperature, and tripping of the thermal fuse will cut power to the flow-through heater 300. In one example, if the internal temperature of the reservoir 302 reaches a threshold temperature of about 200°±8° F., then the thermal fuse will trip and cut power to the flow-through heater 300. This temperature keeps the water below its boiling point so that steam cannot be generated and build up pressure. This thermal fuse feature may be provided as a non-resettable configuration, such that it is not incorporated into the TCU 200, but instead provided as an independent part of the wiring for the flow-through heater 300. Accordingly, the thermal fuse would need to be replaced and reset after being tripped when provided as a non-resettable configuration. Alternatively, it may be tied into the TCU 200 and configured as a re-settable feature that need not be replaced after being tripped.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A water heater and thermostatic control device for a lavatory faucet, comprising:
    a hot water tank having a reservoir and a heating element disposed within the reservoir, the heating element heats ambient temperature water received by the reservoir to produce hot water;
    a thermal mixing valve configured to mix hot water received from the hot water tank with ambient temperature water to produce mixed temperature water;
    a shut off valve configured to permit flow of mixed temperature water to the lavatory faucet; and
    a control unit that is in communication with the lavatory faucet, wherein the control unit is configured to open the shut off valve when instructed by the lavatory faucet, and
    wherein the shut off valve is configured to permit air to bleed or vent through the shut off valve when it is both not energized by the control unit and not subject to water pressure from the mixed temperature water.

2. The water heater and thermostatic control device of claim 1, wherein the faucet is temperature adjustable to output water at one or more desired temperatures, and wherein the control unit is in communication with the thermal mixing valve to control metering of hot water and ambient temperature water within the thermal mixing valve to produce mixed temperature water having a temperature that equals the one or more desired temperatures.

3. The water heater and thermostatic control device of claim 2, wherein the control unit adjusts metering within the thermal mixing valve based on temperature readings from a thermocouple that measures temperature of the mixed temperature water.

4. The water heater and thermostatic control device of claim 3, wherein the thermocouple is downstream from the shut off valve.

5. The water heater and thermostatic control device of claim 1, wherein the hot water tank includes a level sensor that is in communication with the control unit.

6. The water heater and thermostatic control device of claim 5, wherein the control unit controls power input to the heating element based on readings from the level sensor.

7. The water heater and thermostatic control device of claim 1, wherein the control unit controls the heating element based on temperature readings from a thermocouple that measures temperature of water within the reservoir.

8. The water heater and thermostatic control device of claim 1, wherein the shut off valve is configured to inhibit flow of mixed water through the shut off valve when it is both subject to water pressure from the mixed temperature water and not energized by the control unit.

9. The water heater and thermostatic control device of claim 8, wherein the shut off valve is configured to allow flow of mixed water through the shut off valve when it is energized by the control unit.

10. The water heater and thermostatic control device of claim 1, wherein the heating element is configured as a flow-through heater.

11. The water heater and thermostatic control device of claim 1, wherein the hot water tank includes a pressure relief valve.

12. The water heater and thermostatic control device of claim 1, wherein the hot water tank includes a thermostat unassociated with the control unit and the hot water tank is configured to cut power to the heating element based on readings from a thermostat.

13. The water heater and thermostatic control device of claim 12, wherein the hot water tank further includes a manual reset for resupplying power to the heating element.

14. The water heater and thermostatic control device of claim 1, wherein the hot water tank includes a thermal fuse configured to trip and cut power to the heating element.

15. The water heater and thermostatic control device of claim 1, wherein the hot water tank includes an insulator blanket.

16. A water heater and thermostatic control device for a lavatory faucet, comprising:
a hot water tank having a reservoir and a heating element disposed within the reservoir, the heating element heats ambient temperature water received by the reservoir to produce hot water;
a thermal mixing valve configured to mix hot water received from the hot water tank with ambient temperature water to produce mixed temperature water;
a shut off valve configured to permit flow of mixed temperature water to the lavatory faucet, wherein the shut off valve includes a diaphragm and an armature assembly, and wherein the diaphragm is configured to permit air to bleed or vent through the shut off valve when the mixed temperature water is not imparting pressure on the diaphragm; and
a control unit that is in communication with the lavatory faucet, wherein the control unit is configured to open the shut off valve when instructed by the lavatory faucet.

17. The water heater and thermostatic control device of claim 16, wherein the shut off valve includes a solenoid that may be energized by the control unit, and wherein energization of the solenoid causes the armature assembly to move between a closed condition and an open condition.

18. The water heater and thermostatic control device of claim 17, wherein the armature assembly is biased in the closed condition such that mixed water is inhibited from flowing through the shut off valve.

19. The water heater and thermostatic control device of claim 18, wherein energization of the solenoid moves the armature assembly into the open condition such that mixed water may flow through the shut off valve.

20. A water heater and thermostatic control device for a lavatory faucet, comprising:
a hot water tank having a reservoir and a heating element disposed within the reservoir, the heating element heats ambient temperature water received by the reservoir to produce hot water;
a thermal mixing valve configured to mix hot water received from the hot water tank with ambient temperature water to produce mixed temperature water;
a shut off valve configured to permit flow of mixed temperature water to the lavatory faucet; and
a control unit that is in communication with the lavatory faucet, wherein the control unit is configured to open the shut off valve when instructed by the lavatory faucet, and
wherein the shut off valve is configured to permit air to bleed or vent through the shut off valve when it is not energized by the control unit and/or not subject to water pressure from the mixed temperature water.

* * * * *